(12) United States Patent
Granata

(10) Patent No.: US 11,492,033 B2
(45) Date of Patent: Nov. 8, 2022

(54) MULTIPLE-DRIVE VEHICLE

(71) Applicant: Francesco Granata, Grammichele (IT)

(72) Inventor: Francesco Granata, Grammichele (IT)

( * ) Notice: Subject to any disclaimer, the term of this patent is extended or adjusted under 35 U.S.C. 154(b) by 0 days.

(21) Appl. No.: 17/050,467

(22) PCT Filed: Apr. 24, 2018

(86) PCT No.: PCT/IB2018/052830
§ 371 (c)(1),
(2) Date: Oct. 26, 2020

(87) PCT Pub. No.: WO2019/207341
PCT Pub. Date: Oct. 31, 2019

(65) Prior Publication Data
US 2021/0061343 A1 Mar. 4, 2021

(51) Int. Cl.
| | | |
|---|---|---|
| *B62D 1/22* | (2006.01) | |
| *B60K 5/00* | (2006.01) | |
| *B60K 26/02* | (2006.01) | |
| *B62D 1/16* | (2006.01) | |
| *B62D 7/14* | (2006.01) | |
| *B62D 17/00* | (2006.01) | |

(52) U.S. Cl.
CPC .................. *B62D 1/22* (2013.01); *B60K 5/00* (2013.01); *B60K 26/02* (2013.01); *B62D 1/16* (2013.01); *B62D 7/144* (2013.01); *B62D 17/00* (2013.01)

(58) Field of Classification Search
CPC . B62D 1/16; B62D 1/22; B62D 7/144; B62D 17/00; B62D 61/10; B60K 5/00; B60K 26/02; B60R 2021/0097
See application file for complete search history.

(56) References Cited

U.S. PATENT DOCUMENTS

| | | | | |
|---|---|---|---|---|
| 3,197,229 A | * | 7/1965 | Houlton | B66C 19/005 |
| | | | | 180/414 |
| 4,726,441 A | * | 2/1988 | Conley | G05G 1/34 |
| | | | | 180/322 |

FOREIGN PATENT DOCUMENTS

| | | | | |
|---|---|---|---|---|
| EP | 3074295 B1 | * | 11/2017 | B62D 1/22 |
| WO | WO-2019207341 A1 | * | 10/2019 | B62D 1/22 |

* cited by examiner

*Primary Examiner* — Barry Gooden, Jr.
(74) *Attorney, Agent, or Firm* — Mark M. Friedman

(57) ABSTRACT

A multiple-drive vehicle comprises a first driving position (3) for a first driver provided with first driving means (4), a second driving position (5) for a second driver provided with second driving means (6), a first pair of wheels (9) mechanically connected to the first driving means (4) and a second pair of wheels (10) mechanically connected to the second driving means (6). The first driving means (5) and the second driving means (6) are independent of each other for moving the respective pairs of wheels (9, 10) in an independent manner from each other.

9 Claims, 1 Drawing Sheet

MULTIPLE-DRIVE VEHICLE

TECHNICAL FIELD

Figure 1:
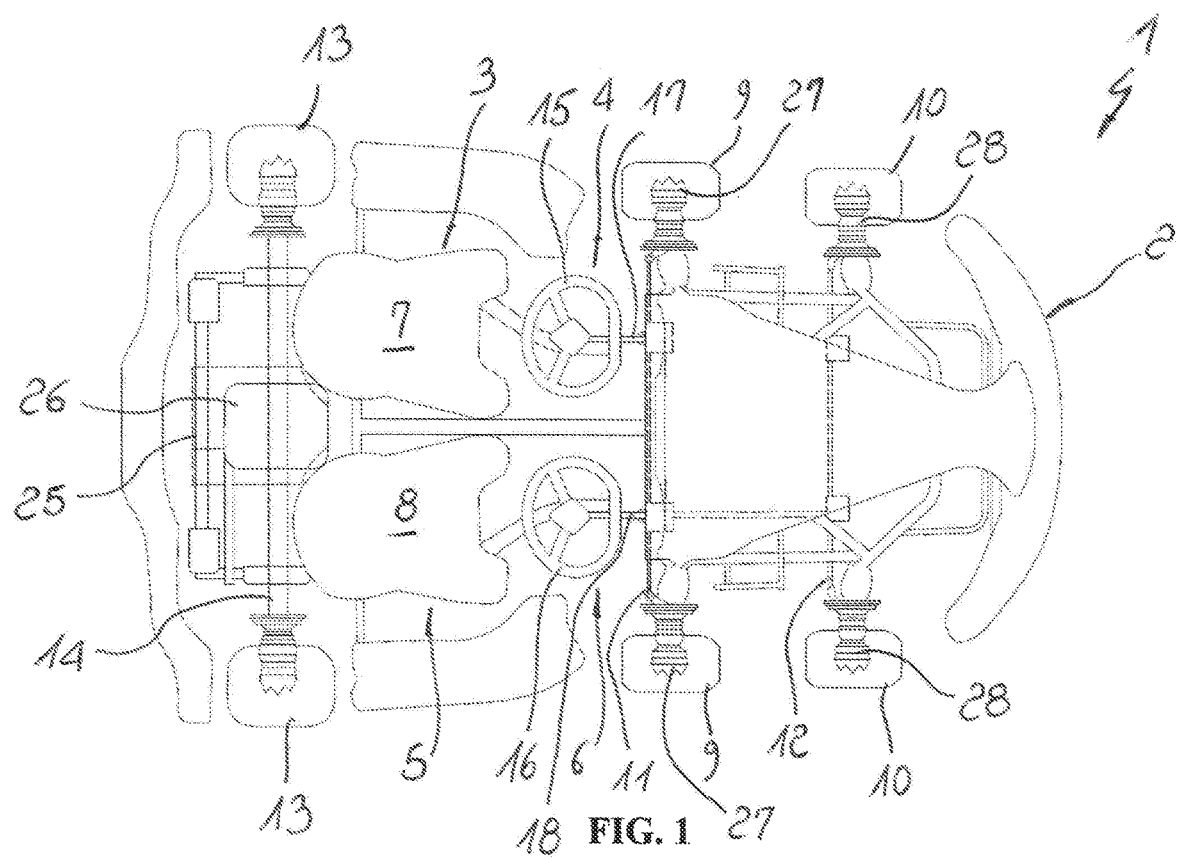

The present invention is inserted in the technical field of road vehicles and has particularly for object a multiple-drive vehicle, such as a kart or similar, suitable to be driven by one or more persons at the same time.

STATE OF THE ART

Motor vehicles provided with multiple controls are known, that is, configured to allow two users to simultaneously impart a command to the vehicle.

In particular, in the sector of motor vehicles intended for driving schools, motor vehicles are known which have two pedals connected to each other so that the instructor can intervene on the student's pedal in case of need and operate the controls, such as brake, clutch and possibly accelerator. In some less common models a double steering wheel can also be provided.

In any case, the commands are always connected to each other so that one of them prevails over the other.

CN104401408 instead describes a vehicle, in particular a heavy truck, having a double steering wheel to be able to be driven from both front seats.

Both steering wheels are connected to the same axle to be used in an alternative way, according to the driving modes different from country to country.

CN203318484 describes a vehicle transmission device having a main steering wheel and an auxiliary steering wheel adapted to be maneuvered by the passenger of the vehicle but which nevertheless acts on the same axle on which the main steering wheel controlled by the driver operates.

Therefore, there is the need for a vehicle that can be driven by two different users simultaneously but without the movements imparted on one of the commands could modify the behaviour of the other commands.

SCOPE OF THE INVENTION

The object of the present invention is to overcome the aforementioned drawbacks by providing a multiple-drive vehicle, mainly for recreational purposes, which can be driven by two or more users simultaneously but leaving autonomous both the drivers.

A particular object is to provide a multiple-drive vehicle which requires high synchronization between the driving styles of the different drivers for its correct advancement.

A further object is to provide a multiple-drive vehicle which allows particular effects to be transmitted to the drivers or to the vehicle due to different behaviours of the drivers.

Said objects, as well as others which will become clearer hereinafter, are achieved by a multiple-drive vehicle which, according to claim 1, comprises a first driving position for a first user provided with first driving means, a second driving position for a second user provided with second driving means, a first pair of wheels mechanically connected to said first driving means, a second pair of wheels mechanically connected to said second driving means, said first driving means and said second driving means being independent of each other to move the respective pairs of wheels independently of each other.

In this way each driver can give a directional command to the vehicle independently of the other driver.

As a result, high coordination between the two drivers will be necessary for the vehicle to proceed correctly.

The vehicle configured in this way will allow to experiment new driving modes mainly for recreational purposes.

In fact, each axle equipped with its wheels will have its own directionality so that, for example, while the wheels controlled by one of the drivers are completely on the left, those of the other driver may be completely on the right.

This fact triggers a series of unforeseen chases during the march with the consequent difficulty for the two drivers who must find among them a similar driving style in order to not finish off the track or simply to be competitive with the others.

At the same time the vehicle will allow two drivers to alternate driving without having to change places.

Advantageous embodiments of the invention are obtained according to the dependent claims.

BRIEF DISCLOSURE OF THE DRAWINGS

Figure 2:
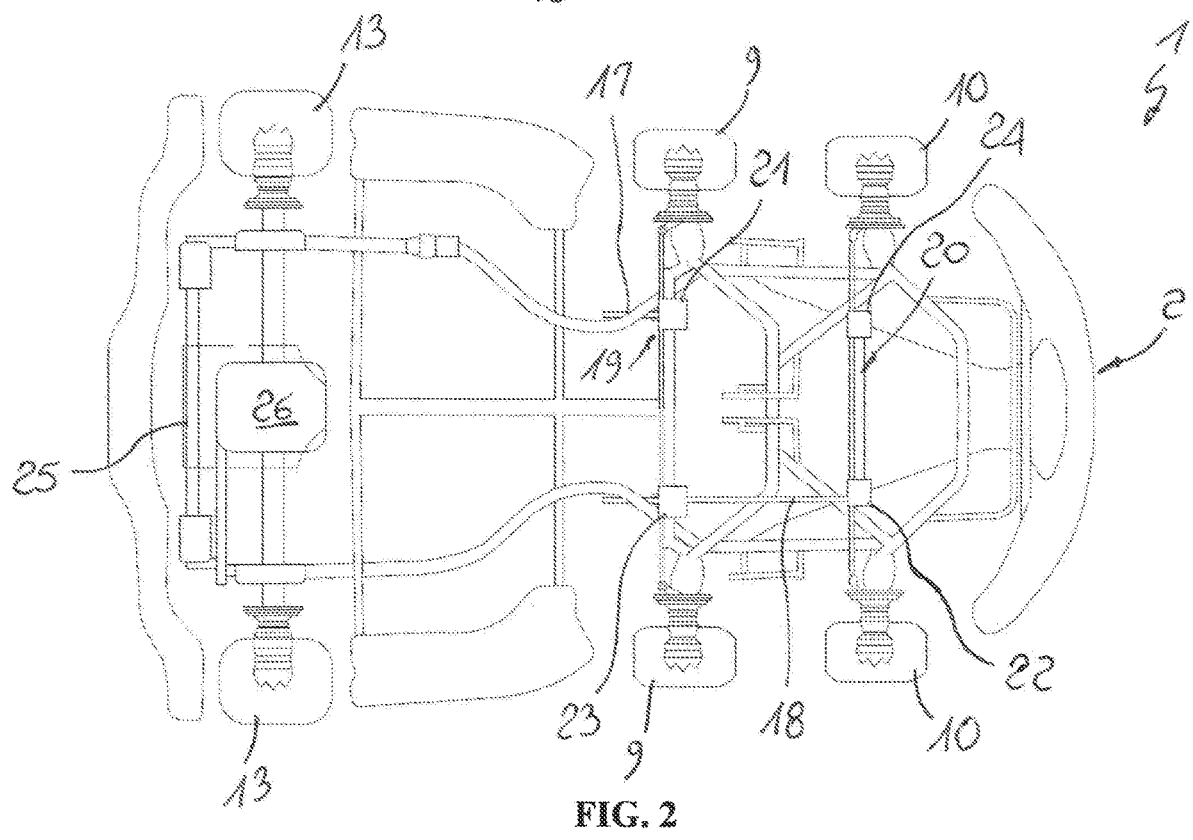

Further features and advantages of the invention will become more evident in the light of the detailed description of a preferred but non-limiting embodiment of a multiple-drive vehicle according to the present invention, illustrated as a non-limiting example with the aid of the attached drawings wherein:

FIG. 1 is a top view of the vehicle;
FIG. 2 is a down view of the vehicle;

BEST MODES OF CARRYING OUT THE INVENTION

With reference to the attached figures, a preferred but non-exclusive configuration of a vehicle according to the invention is shown.

In particular, in this embodiment the vehicle, indicated globally by 1, has the typical configuration of a kart, with a frame 2 completely uncovered and formed by tubular bars welded or otherwise fixed to each other.

Compared to traditional karts, frame 2 may be increased both in width and length with increments generally between 30 cm and 40 cm.

The configuration of the frame 2 is not essential for the purposes of the present invention since the vehicle 1 may also be designed as a common automobile or vehicle and therefore will not be described in greater detail.

As shown in FIG. 1, the frame 2 is designed to have a first driving position 3 for a first driver provided with first driving means 4 and a second guide position 5 for a second driver provided with second driving means 6.

The two driving positions 3, 5 are side by side with respect to the direction of travel of the vehicle 1 and each comprise a seat 7, 8 for the respective driver.

The vehicle 1 comprises two pairs of front wheels, with a first pair of front wheels 9 mechanically connected to the first driving means 4 and a second pair of front wheels 10 mechanically connected to the second driving means 6.

The two pairs of front wheels 9, 10 are arranged in front of the driving positions 3, 5 and in particular are associated with respective front axles 11, 12 which are mutually parallel and offset along the forwarding direction of the vehicle 1.

In the illustrated embodiment, the first pair of front wheels 9 connected to the first driving position 3, on the left in the illustrated embodiment, is arranged rearwardly of the second pair of front wheels 10, even if their arrangement could be reversed.

At the rear of the frame 2 there is a single pair of rear wheels 13 connected to a same rear drive axle 14, although there may also be several pairs of rear wheels mounted on the same traction axis or on separate traction axles and parallel to each other.

In general, the rear wheels 13 will have a fixed rotation axis and will not be steerable.

The first driving means 4 and the second guide means 6 are independent of each other and do not interact with each other so as to be able to move the respective pairs of front wheels 9, 10 independently of each other.

Both the first driving means 4 and the second driving means 6 comprise respective steering wheels 15, 16 each provided with a steering column 17, 18 connected to the corresponding pairs of front wheels 9, 10 by respective steering mechanisms 19, 20.

As more clearly visible from FIG. 2, each steer mechanism 19, 20 comprises a front axle 11, 12 divided into two axle shafts by a respective differential mechanism 21, 22 connected to the respective column 17, 18.

Each front axle 11, 12 is also provided with a second differential mechanism 23, 24 which will have the aim of transmitting the motion to the axle furthest from the column 17, 18.

Typically for this type of vehicle, the engine 25 is arranged at the rear and connected in a central position to the two rear wheels 13, which will therefore be the driving wheels.

Furthermore, a central rear wheel 26 is also present below the engine 25, with the aim of improving the stability of the vehicle 1.

The central positioning of the engine 25 will allow for an optimal balance of the vehicle 1.

The engine 25 may be of various types, also depending on the category in which the vehicle is approved.

The transmission may comprise a chain or belt with variator, always depending on the engine 25.

The axle shafts of the front wheels 9, 10 may also comprise means for adjusting the camber angle associated with the hubs 27, 28 for connecting the front wheels 9, 10 to the respective axles 11, 12, in order to decrease or increase the height of the wheels 9, 10 during the steering or to increase or decrease the reactivity of the vehicle to the steering.

In order to increase the independence of the guide between the two positions 3, 5, both the first driving means 4 and the second driving means 6 may comprise respective braking means, not shown, adapted to independently operate on the respective front wheels 9, 10.

The braking means may be selected from those commonly available on the market without particular limitations and therefore will not be further described.

Moreover, the first and second driving means 4, 6 may also comprise respective acceleration and/or power variation commands, also not shown as they are of a type known per se, connected to the engine 25 to vary the power delivered in independent manner from each other.

In this way it will be possible for one driver to brake while the other is still accelerating, creating a motor brake effect on the vehicle with consequent sense of emptiness for one of the two drivers.

Finally, it will be possible to provide communication means between the drivers seated at the driving positions 3, 5.

The communication means will preferably be of the wireless type and associated with mobile transmitting devices of wearable type, such as helmets, headphones and the like.

Alternatively, the communication means may comprise one or a pair of transmitters integrated in the vehicle frame and to which the drivers may connect a respective receiving apparatus, either by cable or wirelessly.

The vehicle is susceptible of numerous modifications and variations, all of which are within the inventive concept expressed in the appended claims. All the details may be replaced by other technically equivalent elements, and the materials may be different according to requirements, without departing from the scope of protection of the present invention.

Even though the vehicle has been described with particular reference to the attached figures, the reference numbers used in the description and claims are used to improve the intelligence of the invention and do not constitute any limitation to the claimed scope of protection.

The invention claimed is:

1. A multiple-drive vehicle comprising:
a first driving position (3) for a first driver provided with first driving means (4);
a second driving position (5) for a second driver provided with second driving means (6);
a first pair of wheels (9) mechanically connected to said first driving means (4);
a second pair of wheels (10) mechanically connected to said second driving means (6), said first driving means (5) and said second driving means (6) being independent of each other for moving the respective pairs of wheels (9, 10) in an independent manner from each other;
characterized in that said first and said second pair of wheels (9, 10) are arranged forward of said driving positions (3, 5).

2. Vehicle as claimed in claim 1, characterized in that said first and said second driving means (4, 6) comprise respective steering wheels (15, 16) each provided with a steering column (17, 18) connected to said corresponding pairs of wheels (9, 10) by means of respective steering mechanisms (19, 20).

3. Vehicle as claimed in claim 2, characterized in that said guide positions (3, 5) are mutually side by side with respect to the forward direction of the vehicle.

4. Vehicle as claimed in claim 3, characterized in that said first and said second pair of front wheels (9, 10) have respective front axles (11, 12) mutually parallel and staggered along the forward direction.

5. Vehicle as claimed in claim 4, characterized in that said first and said second driving means (4, 6) comprise respective braking means adapted to operate on said corresponding pairs of wheels (9, 10) in the independent manner from each other.

6. Vehicle as claimed in claim 5, characterized in that said first and said second driving means (4, 6) comprise respective throttle and/or power regulation commands connected to a same engine (25) to vary a supplied power in the independent manner from each other.

7. Vehicle as claimed in claim 1, characterized by comprising a rear axle (14) with two lateral rear wheels (13) connected to an engine (25) and a central rear wheel (26) arranged below said motor (25).

8. Vehicle as claimed claim 1, characterized by comprising means for adjusting the camber angle associated with connection hubs of said pairs of front wheels (9, 10) to the respective axles (11, 12).

9. Vehicle as claimed in claim 1, characterized by comprising means of communication between the drivers sitting in said driving positions (3, 5).

\* \* \* \* \*